(12) United States Patent
Wordley

(10) Patent No.: US 9,854,306 B2
(45) Date of Patent: Dec. 26, 2017

(54) METHODS AND SYSTEMS FOR CONTENT NAVIGATION AMONG PROGRAMS PRESENTING ADVERTISING CONTENT

(71) Applicant: ECHOSTAR TECHNOLOGIES L.L.C., Englewood, CO (US)

(72) Inventor: Chris Wordley, West Yorkshire (GB)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 77 days.

(21) Appl. No.: 14/444,071

(22) Filed: Jul. 28, 2014

(65) Prior Publication Data
US 2016/0029082 A1 Jan. 28, 2016

(51) Int. Cl.
*H04N 5/445* (2011.01)
*H04N 21/454* (2011.01)
(Continued)

(52) U.S. Cl.
CPC .......... *H04N 21/454* (2013.01); *H04H 20/26* (2013.01); *H04H 60/375* (2013.01); *H04H 60/65* (2013.01); *H04N 21/4263* (2013.01); *H04N 21/4383* (2013.01); *H04N 21/44008* (2013.01); *H04N 21/462* (2013.01); *H04N 21/466* (2013.01); *H04N 21/4755* (2013.01);
(Continued)

(58) Field of Classification Search
CPC ........... H04N 21/4384; H04N 21/4263; H04N 21/4532; H04N 21/482; H04N 5/50
USPC .............................. 725/32, 40, 42
See application file for complete search history.

(56) References Cited

U.S. PATENT DOCUMENTS 6,373,904 B1  4/2002  Sakamoto et al.
7,546,618 B2  6/2009  Bacon
(Continued)

FOREIGN PATENT DOCUMENTS

EP  1 879 376 A2  1/2008
EP  2 750 398 A1  7/2014
(Continued)

OTHER PUBLICATIONS

European Search Report for EP 13197477 dated Mar. 25, 2014, 2 pages.
(Continued)

*Primary Examiner* — An Son Huynh
(74) *Attorney, Agent, or Firm* — Kilpatrick Townsend & Stockton LLP

(57) ABSTRACT

Systems and methods for aiding user content navigation are described. An exemplary system may include an electronic device configured to receive audiovisual content and/or user inputs. The electronic device may additionally include one or more outputs coupled with a display device. The electronic device may further include one or more processors as well as memory, which when executed by the one or more processors, cause them to perform one or more navigation functions to receive a channel change command to adjust from a first channel to a second channel. The one or more processors may further be caused to determine that the second channel is presenting advertising content instead of program content, and determine that a third channel is presenting program content. The one or more processors may further be caused to adjust the output to the third channel.

16 Claims, 6 Drawing Sheets

(51) Int. Cl.
  *H04N 21/426* (2011.01)
  *H04N 21/44* (2011.01)
  *H04N 21/466* (2011.01)
  *H04N 21/482* (2011.01)
  *H04N 21/462* (2011.01)
  *H04H 60/37* (2008.01)
  *H04N 21/438* (2011.01)
  *H04N 21/475* (2011.01)
  *H04N 21/81* (2011.01)
  *H04H 20/26* (2008.01)
  *H04H 60/65* (2008.01)

(52) U.S. Cl.
  CPC ......... *H04N 21/482* (2013.01); *H04N 21/812* (2013.01); *H04H 2201/60* (2013.01)

(56) References Cited

U.S. PATENT DOCUMENTS

| | | | |
|---|---|---|---|
| 7,929,697 B2 | 4/2011 | McNeely et al. | |
| 9,106,965 B2 | 8/2015 | Kummer et al. | |
| 9,161,090 B2 | 10/2015 | Kummer et al. | |
| 9,635,413 B2 | 4/2017 | Innes et al. | |
| 2002/0042914 A1* | 4/2002 | Walker | G06Q 30/02 725/36 |
| 2002/0087973 A1* | 7/2002 | Hamilton | H04N 5/4401 725/32 |
| 2002/0092017 A1* | 7/2002 | Klosterman | H04N 7/088 725/35 |
| 2002/0138834 A1* | 9/2002 | Gerba | H04N 5/44543 725/42 |
| 2003/0002577 A1 | 1/2003 | Pinder | |
| 2003/0115589 A1 | 6/2003 | D'Souza et al. | |
| 2003/0123657 A1 | 7/2003 | Bjordammen et al. | |
| 2003/0159157 A1 | 8/2003 | Chan | |
| 2003/0196201 A1* | 10/2003 | Schein | H04N 5/44543 725/42 |
| 2003/0196211 A1 | 10/2003 | Chan | |
| 2003/0208756 A1* | 11/2003 | Macrae | G06Q 30/0269 725/34 |
| 2004/0003399 A1 | 1/2004 | Cooper | |
| 2004/0102154 A1 | 5/2004 | Klauss et al. | |
| 2004/0117827 A1* | 6/2004 | Karaoguz | H04H 20/106 725/42 |
| 2004/0148628 A1* | 7/2004 | Mears | H04N 5/44543 725/43 |
| 2004/0181800 A1 | 9/2004 | Rakib et al. | |
| 2004/0181813 A1 | 9/2004 | Ota et al. | |
| 2004/0189873 A1* | 9/2004 | Konig | G06F 17/30802 348/607 |
| 2004/0255336 A1* | 12/2004 | Logan | H04H 20/28 725/135 |
| 2005/0015803 A1* | 1/2005 | Macrae | H04N 5/44543 725/41 |
| 2005/0175178 A1 | 8/2005 | Candelore et al. | |
| 2005/0283797 A1* | 12/2005 | Eldering | G06Q 30/02 725/35 |
| 2006/0053077 A1 | 3/2006 | Mourad et al. | |
| 2006/0064383 A1 | 3/2006 | Marking | |
| 2006/0206912 A1* | 9/2006 | Klarfeld | G11B 27/105 725/40 |
| 2007/0040947 A1 | 2/2007 | Koga | |
| 2007/0107010 A1* | 5/2007 | Jolna | G06Q 30/02 725/34 |
| 2007/0109445 A1 | 5/2007 | Lee | |
| 2007/0115391 A1* | 5/2007 | Anderson | H04N 5/45 348/565 |
| 2007/0136753 A1* | 6/2007 | Bovenschulte | H04H 60/31 725/46 |
| 2007/0188665 A1 | 8/2007 | Watson et al. | |
| 2007/0192586 A1 | 8/2007 | McNeely | |
| 2008/0022299 A1 | 1/2008 | Le Buhan | |
| 2008/0066111 A1* | 3/2008 | Ellis | H04N 5/44543 725/57 |
| 2008/0086745 A1* | 4/2008 | Knudson | G06Q 30/02 725/40 |
| 2008/0271076 A1* | 10/2008 | Schlack | G06F 21/10 725/39 |
| 2009/0153747 A1 | 6/2009 | Grimes | |
| 2009/0178079 A1* | 7/2009 | Derrenberger | H04N 5/44543 725/42 |
| 2009/0183196 A1 | 7/2009 | Chen et al. | |
| 2009/0199238 A1* | 8/2009 | Kummer | H04N 5/445 725/39 |
| 2009/0260040 A1* | 10/2009 | Kritt | H04N 5/445 725/56 |
| 2009/0313674 A1 | 12/2009 | Ludvig et al. | |
| 2009/0322962 A1 | 12/2009 | Weeks | |
| 2010/0131983 A1 | 5/2010 | Shannon et al. | |
| 2010/0199299 A1* | 8/2010 | Chang | H04N 7/17318 725/32 |
| 2011/0055866 A1 | 3/2011 | Piepenbrink et al. | |
| 2011/0093897 A1* | 4/2011 | Gerba | H04N 21/4314 725/42 |
| 2011/0131622 A1 | 6/2011 | Wu et al. | |
| 2011/0219396 A1 | 9/2011 | Kudelski | |
| 2011/0247037 A1* | 10/2011 | Pandey | H04N 5/44543 725/42 |
| 2011/0310305 A1 | 12/2011 | Alexander | |
| 2012/0131627 A1 | 5/2012 | Chittella | |
| 2012/0222066 A1* | 8/2012 | Charania | H04N 21/44222 725/34 |
| 2012/0311649 A1 | 12/2012 | Patten et al. | |
| 2013/0014162 A1 | 1/2013 | Chen et al. | |
| 2013/0135535 A1 | 5/2013 | Ling | |
| 2013/0339997 A1 | 12/2013 | Farkash et al. | |
| 2014/0086407 A1 | 3/2014 | Gustafsson et al. | |
| 2014/0189736 A1 | 7/2014 | Kummer et al. | |
| 2014/0189739 A1 | 7/2014 | Kummer et al. | |
| 2014/0196094 A1 | 7/2014 | Singh et al. | |
| 2014/0229972 A1 | 8/2014 | Kudelski | |
| 2014/0269930 A1* | 9/2014 | Robinson | H04N 21/2365 375/240.24 |
| 2014/0282759 A1* | 9/2014 | Harvey | H04N 21/4333 725/89 |
| 2015/0095948 A1* | 4/2015 | Kummer | H04N 21/6143 725/35 |
| 2015/0312513 A1 | 10/2015 | Kummer et al. | |
| 2016/0029082 A1* | 1/2016 | Wordley | H04N 21/454 725/52 |
| 2017/0085940 A1 | 3/2017 | Innes et al. | |
| 2017/0195715 A1 | 7/2017 | Innes et al. | |

FOREIGN PATENT DOCUMENTS

| | | |
|---|---|---|
| JP | H07 75015 A | 3/1995 |
| JP | 2009-130755 A | 11/2009 |
| WO | 2012/112928 A2 | 8/2012 |

OTHER PUBLICATIONS

International Search Report and Written Opinion for PCT/GB2015/052022 dated Oct. 8, 2015, all pages.
U.S. Appl. No. 13/833,728, filed Mar. 15, 2013, Final Rejection dated Jan. 29, 2015, 31 pages.
U.S. Appl. No. 13/833,728, filed Mar. 15, 2013, Notice of Allowance dated Apr. 9, 2015, 21 pages.
U.S. Appl. No. 13/839,220, filed Mar. 12, 2013, Final Office Action dated Jan. 21, 2015, 23 pages.
U.S. Appl. No. 13/839,220, filed Mar. 12, 2013, Notice of Allowance dated Jun. 3, 2015, 22 pages.
U.S. Appl. No. 14/863,143, filed Sep. 23, 2015 Notice of Allowance dated Dec. 21, 2016, all pages.
Office Action for EP 13197477.6 dated Nov. 24, 2016, all pages.
U.S. Appl. No. 14/863,143, filed Sep. 23, 2015 Non Final Rejection dated Aug. 23, 2016, all pages.
U.S. Appl. No. 14/789,737, filed Jul. 1, 2015 Non-Final Rejection dated Nov. 22, 2016, all pages.

(56) References Cited

OTHER PUBLICATIONS

U.S. Appl. No. 14/789,737, filed Jul. 1, 2015 Notice of Allowance dated Apr. 26, 2017, all pages.

* cited by examiner

METHODS AND SYSTEMS FOR CONTENT NAVIGATION AMONG PROGRAMS PRESENTING ADVERTISING CONTENT

TECHNICAL FIELD

The present technology relates to systems and methods for aiding a user of an electronic device. More specifically, the present technology relates to navigating among programs presenting advertising content.

BACKGROUND

As technology, such as audiovisual technology, continues to improve, a variety of modifications can be performed based on user preferences. For example, if a viewer is watching commercial television, the viewer may have pause and fast-forward capabilities throughout the broadcast. However, fast-forward technology may be limited to allowing a user only to skip up to the point of live television. Additionally, when a user is changing channels to view other stations, the user is unable to tell what is being presented if the program is currently on commercial break. This may result in frustration for viewers wishing to be able to skip channels that are on commercial break.

Thus, there is a need for improved methods and systems for aiding a user during channel navigation. These and other needs are addressed by the present technology.

SUMMARY

Systems and methods for aiding user content navigation are described. An exemplary system may include an electronic device configured to receive audiovisual content and/or user inputs. The electronic device may additionally include one or more outputs coupled with a display device. The electronic device may further include one or more processors as well as memory, which when executed by the one or more processors, cause them to perform one or more navigation functions to receive a channel change command from a user to adjust from a first channel to a second channel. The one or more processors may further be caused to determine that the second channel is presenting advertising content instead of program content, and determine that a third channel is presenting program content. The one or more processors may further be caused to adjust the output to the display to the third channel.

The electronic device may include one or more tuners, and the first tuner may be assigned or set to the first channel. Methods performed by the electronic device or instructions performed by the device may further include receiving instructions from a user to adjust channels based on a determination of each channel presenting program content over advertising content. In embodiments the received audiovisual content may include identification information for each program included in the content, where the identification information identifies advertising content within each program. The processors may be further caused to adjust a second tuner to the second channel prior to adjusting the output to the display, and review the content being presented on the second channel to determine whether advertising content or program content is being displayed.

The electronic device may adjust the output to the display to the third channel automatically in embodiments, and the processors may be further caused to inform the user that the second channel is presently displaying advertising content in disclosed embodiments. The processors may be further caused to request instructions from the user regarding whether to adjust the display to the third channel. The electronic device may also determine whether the second channel is a known commercial-free channel, and in disclosed embodiments the third channel may include the next sequential channel to the first channel and second channel. In disclosed embodiments the electronic device may include a television receiver.

Systems and methods of the disclosed technology may also utilize an electronic device having at least one input component configured to receive audiovisual content including both program content and advertising content. The electronic device may also include at least one output component communicatively coupled with at least one display device, as well as one or more processors and memory configured to store instructions that may cause one or more of the processors to generate a programming guide including a first plurality of channels to be displayed upon transmission of the programming guide to the display device. The processors may also adjust each of a plurality of tuners of the electronic device to each individual channel of the first plurality of channels, and determine whether each of the individual channels of the first plurality of channels is presenting advertising content. The processors may be caused to identify on the programming guide each individual channel that is currently presenting advertising content, and transmit the programming guide with identifications to the display device.

The processors of the electronic device may be further caused to receive a user command to adjust the programming guide to a second plurality of channels. They may also be caused to adjust each of the plurality of tuners of the electronic device to each individual channel of the second plurality of channels, and determine whether each of the individual channels of the second plurality of channels is presenting advertising content. They may also adjust the programming guide to the second plurality of channels and identify on the programming guide each individual channel that is presenting advertising content. In embodiments the electronic device may determine not to adjust a tuner to a channel that presents known commercial-free content. The identification may include placing an icon with a program included in the first plurality of channels that is determined to be presenting advertising content, and may include adjusting a display of a program element included in the first plurality of channels in the EPG that is determined to be presenting advertising content. The electronic device may review frames of the received audiovisual content to identify advertising content, and in embodiments the electronic device may include at least one tuner maintained on a particular predetermined channel, and that does not adjust to another channel during additional operations. In disclosed embodiments the electronic device may include at least 4 tuners, and may include a television receiver.

Such technology may provide numerous benefits over conventional techniques. For example, a user who is casually surfing channels may be able to avoid viewing channels that are currently on commercial breaks. Additionally, by identifying programs on a program guide that are on commercial break, a user can know whether or not to select that channel. This may reduce user frustration with switching channels only to end up watching commercials. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology is directed to aiding user navigation to avoid broadcast content that is currently presenting advertising content instead of program content. The technology can allow users to have their content system automatically identify or avoid channels that are presenting commercial content. In so doing, users may receive an improved viewing experience, along with reducing frustrations associated with adjusting channels only to find that the program sought is currently on commercial break. These and other benefits will be explained in detail below.

Although embodiments detailed herein are directed toward controlling television based equipment, the principles easily can be extended to other types of content and devices, such as DVD equipment, digital video recorder (DVR) equipment, video game equipment, computer equipment, handheld electronic devices, and the like. In addition, the terms "television" or "television service" can include traditional television programming, such as linear television programs, as well as other types of audio, video and/or audiovideo content, such as on-demand video content, on-demand or streaming audio content, streaming video content and the like delivered via any type of content delivery systems, such as cable, satellite, cellular/wireless, terrestrial broadcast, Internet/IP, and/or any other content delivery technology or system currently known or hereafter developed. Furthermore, embodiments herein describe set-top boxes or receivers and/or other devices being connected with a television or other device having an electronic display. However, the electronic device can also be incorporated into or be a part of the device having the display or display device, such as a television with an integrated cable, satellite, terrestrial, or IPTV receiver. Alternatively, the electronic device may be a DVR or DVD player including the present technology. The technology discussed herein additionally can be extended to any of a variety of other electronic devices, display devices, or combined devices, such as, for example, computers, tablets, hand-held mobile devices, cell phones, e-readers, personal media players, and the like. A person of ordinary skill in the art will recognize various alterations, additions, omissions, and substitutions.

Figure 1:
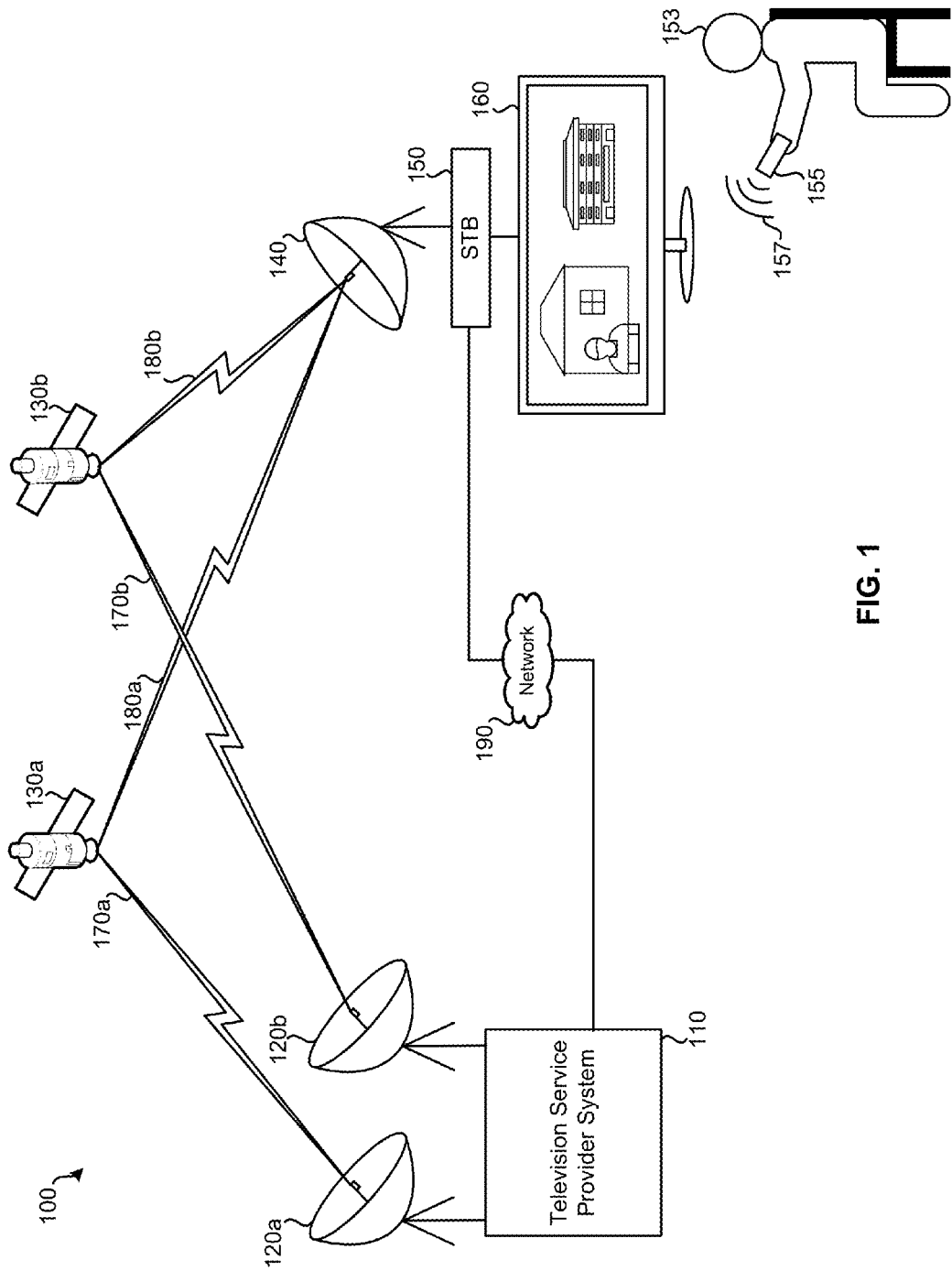
FIG. 1 shows a simplified media service system that may be used in accordance with embodiments of the present technology.

FIG. 1 is a simplified illustration of an embodiment of a satellite television distribution system 100. Satellite television distribution system 100 may include: television service provider system 110, satellite transmitter equipment 120, satellites 130, satellite dish 140, set-top box (STB) 150, and television 160. The television 160 can be controlled by a user 153 using a remote control device 155 that can send wireless signals 157 to communicate with the STB 150 and/or television 160. Although discussed as being wireless for user convenience, the technology may additionally include a wired coupling between the remote control device 155 and STB 150 or television 160. Alternate embodiments of the satellite television distribution system 100 may include fewer or greater numbers of components. While only one satellite dish 140, STB 150 and television 160, collectively referred to as user equipment, are illustrated, it should be understood that multiple (tens, thousands, millions, etc.) instances of user equipment may be connected within the data communication network 190.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels or audio channels from various sources. Such television channels may include multiple television channels that contain the same content, but may be in different formats, such as high-definition and standard-definition. To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120, and/or other satellite transmitter equipment, to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130a. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
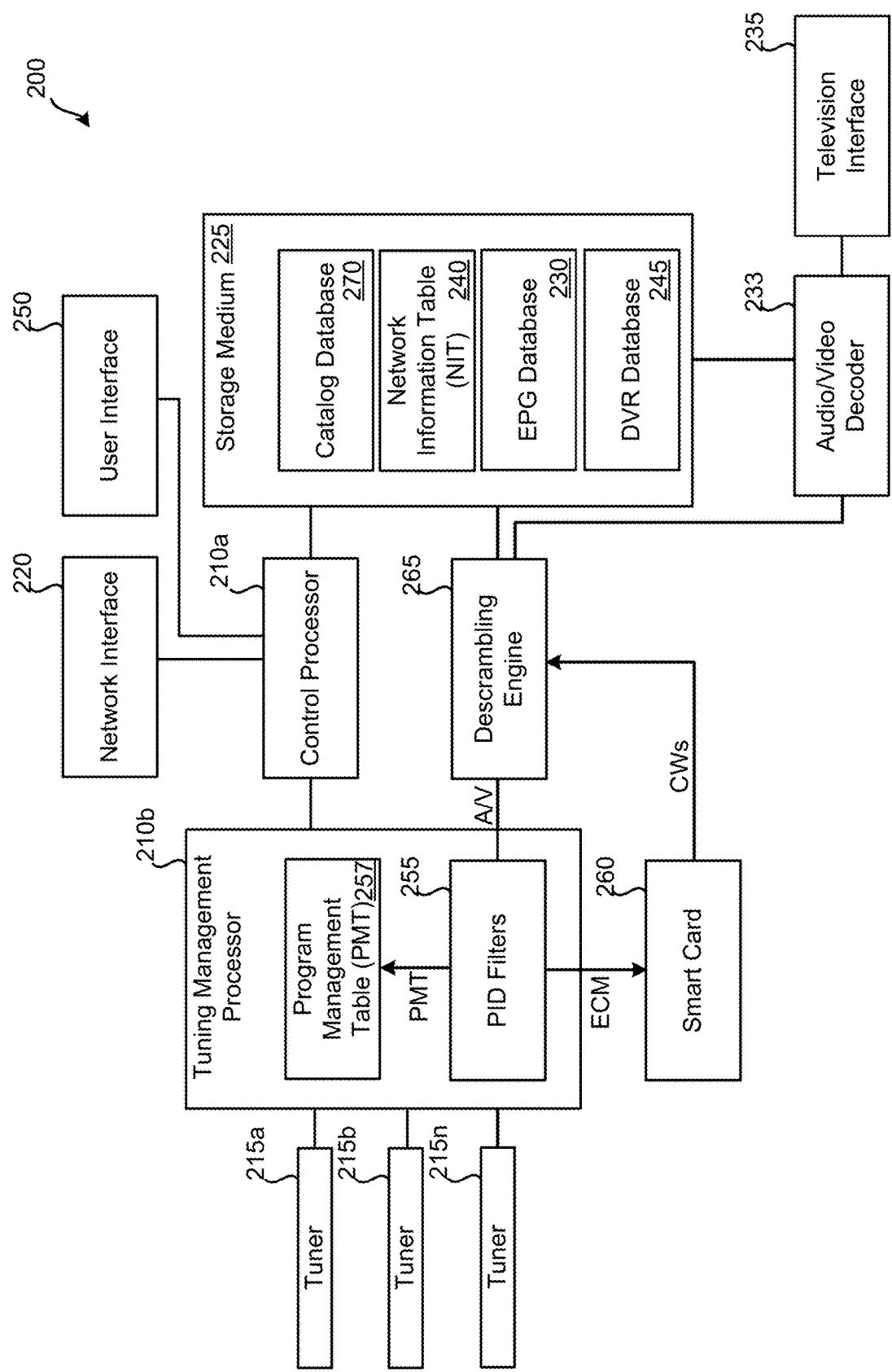
FIG. 2 illustrates an exemplary electronic device that may be used in accordance with embodiments of the present technology.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional details of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170a represents a signal between satellite uplink 120a and satellite 130a. Uplink signal 170b represents a signal between satellite uplink 120b and satellite 130b. Each of uplink signals 170 may contain streams of one or more different television channels. For example, uplink signal 170a may contain a certain group of television channels, while uplink signal 170b contains a different grouping of television channels. Each of these television channels may be scrambled such that unauthorized persons are prevented from accessing the television channels.

Transponder stream 180a represents a signal between satellite 130a and satellite dish 140. Transponder stream 180b represents a signal path between satellite 130b and satellite dish 140. Each of transponder streams 180 may contain one or more different television channels in the form of transponder streams, which may be at least partially scrambled. For example, transponder stream 180a may include a first transponder stream containing a first group of television channels, while transponder stream 180b may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region, e.g., to distribute local television channels to the relevant market. Different television channels may be transmitted using the same frequency of the transponder stream to a different geographic region.

FIG. 1 illustrates transponder stream 180a and transponder stream 180b being received by satellite dish 140. For a first group of television channels, satellite dish 140 may receive a transponder stream of transponder stream 180a; for a second group of channels, a transponder stream of transponder stream 180b may be received. STB 150 may decode the received transponder stream. As such, depending on which television channel(s) are desired, a transponder stream from a different satellite, or a different transponder of the same satellite, may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190.

FIG. 1 illustrates an example of a satellite-based television channel distribution system. It should be understood, however, that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. It is also to be understood that the technology disclosed herein can be practiced on and by cable, satellite, internet-based, over-the-air, or any other system that distributes video for display.

FIG. 2 illustrates an embodiment of a television receiver 200, in accordance with certain embodiments of the present disclosure. The television receiver 200 may correspond to the television receiver or set-top box (STB) 150 of FIG. 1. In some embodiments, the receiver 200 may include more or less functionality as compared to the STB 150, and may depend at least to a certain degree on receiver to implement certain features or functionality.

Television receiver 200 may be in the form of a separate device configured to be connected with one or more display devices, such as televisions 160. Embodiments of television receiver 200 can include set top boxes (STBs). In addition to being in the form of an STB, a television receiver may be incorporated as part of another device, such as a television, other form of display device, video game console, computer, mobile phone, tablet, or the like. For example, a television may have an integrated television receiver, which does not involve an external STB being coupled with the television.

Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 270, remote control interface or user interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210b may control how many video streams are provided to individual display devices, which may be defined based on user preferences. Control processor 210a may also communicate with network interface 220 and remote control interface 250. Control processor 210a may handle incoming data from network interface 220 and remote control interface 250. Additionally, control processor 210a may be configured to output data via network interface 220.

Tuners 215 may include one or more tuners used to tune to transponders that include broadcasts of one or more television channels. In some embodiments, two, three, or more than three tuners may be present, such as four, six, or eight tuners or more. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. In disclosed embodiments, tuner 215 may include a full-band tuner configured to receive the whole broadcast band on a single tuner. If multiple television channels transmitted on the same transponder stream are desired, a single tuner of tuners 215 may be used to receive the signal containing the multiple television channels for presentation and/or recording. Tuners 215 may receive commands from tuning management processor 210b. Such commands may instruct tuners 215 to tune to certain frequencies. In some embodiments, the key combination database and/or remote control lock rules are stored and processed by the remote control.

Network interface 220 may be used to communicate via an alternate communication channel with a television service provider, if such communication channel is available. The primary communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. In disclosed embodiments, television programs may be received directly over network interface 220, along with information regarding included advertisements as discussed more thoroughly below. Information may be transmitted and/or received via network interface 220. For instance, instructions from a television service provider may also be received via network interface 220, if connected with the Internet. Network interface 220 may also be used to communicate with mobile devices of users, via a local wireless network, the Internet, and/or a cellular network.

Storage medium 225 may represent one or more non-transitory computer-readable storage mediums. Storage medium 225 may include memory and/or a hard drive. Storage medium 225 may be used to store information received from one or more satellites, via a cable network, via some other form of television service provider network, and/or information received via network interface 220. Storage medium 225 may store information related to EPG database 230, DVR database 245, and/or on-demand programming 270. Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. Information from EPG database 230 may be output as a video stream to a display device. A particular user may issue commands indicating that an EPG interface be presented. A user issuing a command that an EPG be displayed may constitute a change command.

The network information table (NIT) 240 may store information used by television receiver 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by television receiver 200 using storage medium 225. Information that may be present in NIT 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to look up the audio PIDs and video PIDs in another table, such as a program management table (PMT). For example, a program management table (PMT) may store information on audio PIDs and video PIDs for television channels that are transmitted on a transponder frequency.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 270 and/or information from EPG database 230, to a television for presentation. Television interface 235 may also serve to output a CVM. Television interface 235 may be configured to be connected with multiple display devices. Therefore, different video feeds may be presented via different display devices. Television interface 235 may also be configured to output multiple, e.g., 3, 3, 4, 5, 6, etc., video streams to a single display device for simultaneous presentation.

Digital Video Recorder (DVR) functionality may permit a television channel to be recorded for a period of time. DVR functionality of television receiver 200 may be managed by control processor 210*a*. Control processor 210*a* may coordinate the television channel, start time, and stop time of when recording of a television channel is to occur. DVR database 245 may store information related to the recording of television channels. DVR database 245 may store timers that are used by control processor 210*a* to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 200 may be received via satellite. Content from DVR database 245 may be output as a video stream to a display device. A particular user may issue commands indicating that recorded content be presented.

As an example of DVR functionality of television receiver 200 being used to record based on provider-defined timers, a television service provider may configure television receiver 200 to record television programming on multiple, predefined television channels for a predefined period of time, on predefined dates. Channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time, beyond the time which the predefined recording would otherwise be saved. Television programming recorded based on provider-defined timers may be stored to a portion of storage medium 225 for provider-managed television programming storage.

User interface 250 may receive communications from one or more remote controls that allow a user to interact with television receiver 200. User interface 250 may receive and send received commands to control processor 210*a*, which may then process the commands using a control engine. In some embodiments, it may be possible to load some or all preferences to a remote control. As such, the remote control can serve as a backup storage device for user preferences. In such embodiments, the communication link with the remote control via user interface 250 is bidirectional. User interface 250 may be configured to receive commands from one or more remote controls. User interface 250 may receive commands via BLUETOOTH, NFC, an IR-implemented protocol, an RF-implemented protocol, or some other communication protocol.

Security device 260, which may be implemented as a smart card, may be used for decrypting incoming data. The decrypted data may be used by descrambling engine 265 for descrambling video and/or audio. Descrambled video and/or audio may be output by descrambling engine 265 to storage medium 225 for storage, such as in DVR database 245, and/or to decoder module 233 for output to a television or other presentation equipment via television interface 235.

Tuning management processor 210*b* may be in communication with tuners 215 and control processor 210*a*. Tuning management processor 210*b* may be configured to receive commands from control processor 210*a*. Such commands may indicate when to start/stop receiving and/or recording of a television channel and/or when to start/stop causing a television channel to be output to a television. Tuning management processor 210*b* may control tuners 215. Tuning management processor 210*b* may provide commands to tuners 215 that instruct the tuners which satellite, transponder, and/or frequency to tune to. From tuners 215, tuning management processor 210*b* may receive transponder streams of packetized data.

PID filters 255 may be configured to filter data packets based on PIDs. In some embodiments, PID filters 255 are created and executed by tuning management processor 210*b*. In other embodiments, separate hardware may be used to create and execute such PID filters. Depending on a television channel selected for recording/viewing, a PID filter may be created to filter the video and audio packets associated with the television channel, based on the PID assignments present in PMT 257. For example, if a transponder data stream includes multiple television channels, data packets corresponding to a television channel that is not desired to be stored or displayed by the user, may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210*b*.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer systems disclosed further herein.

While the television receiver 200 has been illustrated as a satellite receiver, it is to be appreciated that techniques below may be implemented in other types of television receiving devices, such as cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. Further, as previously detailed, the electronic device that interacts with the remote control may be some other type of device entirely.

Figure 3:
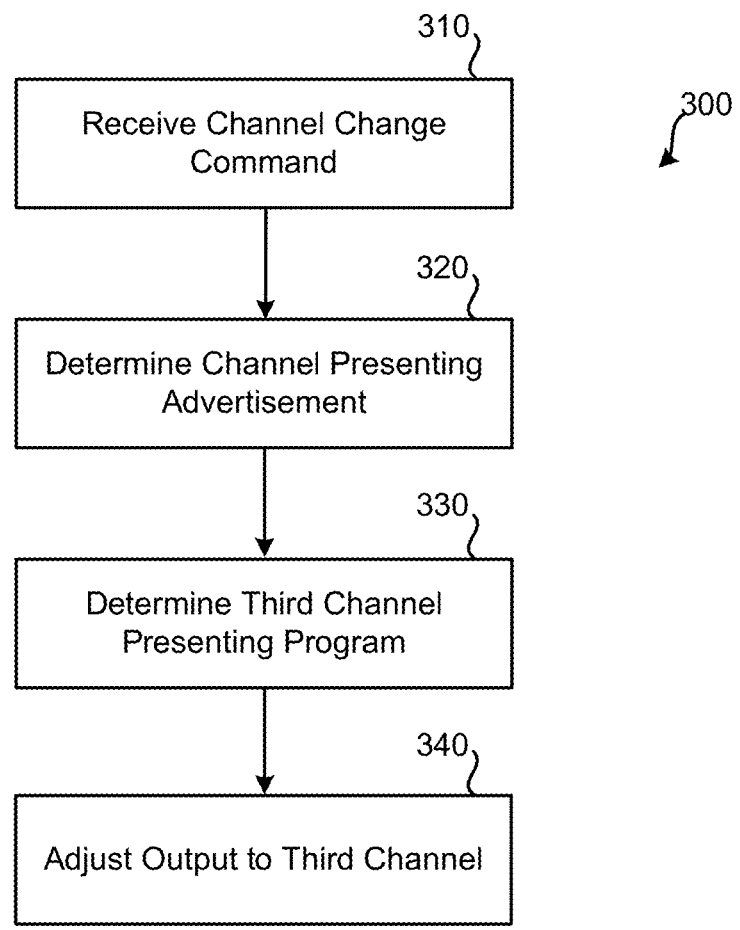
FIG. 3 shows a simplified flow diagram of a method for aiding navigation according to embodiments of the present technology.

The systems and devices previously described may be used in performing various methods. The methods may also be represented by programming stored in memory of a computing device. FIG. 3 illustrates an embodiment of a method 300 for aiding content navigation for a user. Method 300 may be performed using any of the systems or components previously described. Method 300 may allow for an electronic device to adjust channels based on what is being presented currently, and skip or identify channels that are displaying commercials. Each step of method 300 may be performed at or by a single electronic device, such as an STB, DVR, or mobile device, for example, or by multiple devices communicating with one another. Means for performing each step of method 300 include an electronic device and/or the various components of an electronic device or distribution system, such as those detailed in relation to FIGS. 1 and 2. Method 300 may be performed using a computerized device, such as a device incorporating some or all of the components of computer system 600 of FIG. 6.

The electronic device utilized in the technology may be a television receiver or set-top box as previously described, and may include at least one input component configured to receive audiovisual content including both program content and advertising content. This may include broadcast channels, such as local broadcast channels. The electronic device may also include at least one output component communicatively coupled with at least one display device, such as previously described. The electronic device may receive a channel change command at operation 310. The command may be sent by a user currently watching a first channel. The channel change command may include a variety of change options including attempting to adjust the channel up or down one channel, attempting to skip back to the previously viewed channel, or typing in the numbers or symbols identifying a specific channel. For example, a viewer may be watching a program and during a commercial break for that program, the user may wonder what is being played on the next channel, such as the next local channel broadcast. The user may select an up or down channel change to command the electronic device to adjust the channel.

The electronic device may determine that the second channel is presenting advertising content instead of program content on the second channel at operation 320. The electronic device may analyze or review the content being presented on the second channel to determine whether the second channel is presenting advertising content instead of program content. The electronic device may determine that a third channel is presenting program content or is not presenting advertising content at operation 330, and the electronic device may adjust an output to a display device to the third channel at operation 340.

The determination of what is being displayed may be performed in a variety of ways. For example, the electronic device may include at least two or more tuners as previously described. When the channel change command is received to change from the first channel to the second channel, the electronic device may already have a tuner set to the first channel that is currently being viewed. Prior to changing the channel or adjusting the output to the display, the electronic device may assign or set a second tuner to the second channel and review what is being presented to determine whether advertising content or program content is being displayed. Presuming the electronic device determines that the channel is presenting program content, the device may then adjust the output to the second tuner and output the program on the second channel.

On the other hand, if the electronic device determines that the second channel is presenting advertising content, the electronic device may proceed in a number of ways. In one example, the user may simply press the channel 'up' or 'down' button as the initial change command. The receiver may determine that the next sequential channel either higher or lower, which would be the second channel, is presenting advertising data at that time. In one embodiment, the electronic device may then automatically adjust the second tuner, or a third tuner if available, to the next sequential channel either up or down and perform a similar review for advertising content on that channel. If the device determines that this third channel is presenting advertising data, the same process may be performed until a channel presenting program data is found. If that third channel is presenting program data, the electronic device may automatically adjust the output to the display to the third channel.

In another embodiment, the process may proceed with additional user input. For example, utilizing the previous example, when the electronic device determines that the second channel is presenting advertising data, the electronic device may output a message or interactive prompt to the user noting that the second channel is presenting advertisements. Of course, the electronic device may include a command allowing the user to proceed to the second channel anyway in disclosed embodiments. Additionally, the electronic device may request additional information or instructions from the user. These instructions may include requesting whether to proceed to a third channel, or to proceed until program content is located, which may then be presented automatically at that point or after presenting the channel/program information to the user to accept.

An amount of delay or latency may exist due to the review performed, and in disclosed embodiments, the electronic device may anticipate such activity by utilizing multiple tuners. For example, when a first channel is being viewed, the electronic device may automatically adjust other tuners to one or more adjacent channels up or down and preemptively begin reviewing the content. Under this scenario, if a user then selects the channel change, the change can be virtually automatic as the electronic device can already determine what is being presented on the second channel. Such functionality may also be utilized by the user in conjunction with or without prompts from the electronic device.

For example, a user may be watching a commercial broadcast, such as a commercial sporting event on one channel. The user may also be interested in a show on a different channel that is not sequentially surrounding the commercial broadcast. In such a situation, the user may instruct the electronic device to maintain two available tuners on the broadcast being watched, such as a first channel, and on the show available on the alternate channel or second channel. Accordingly, when a commercial break occurs during the sporting event, there will be no latency for the user to switch to the alternate channel, or potentially receive a prompt indicating that the second channel is also on commercial break. Additionally, the user may utilize such technology to continually reference when the first channel is finished presenting advertising.

Continuing the example, during an advertising break in the first channel the user may switch to another channel, but have a tuner maintained on the first channel to review the broadcast for whether it is presenting advertising or program content. The user may select a 'recall' or some other 'last channel' type command to return to the sports broadcast, and be prompted that the advertising break is still ongoing. This way the user may avoid missing additional content of the program. Additionally, the electronic device may perform these tasks automatically. For example, the user may instruct or the electronic device may be configured to automatically continue to review the first channel for when the program content returns. The electronic device may then prompt the user that the first channel has finished the advertisement break, and request user instruction whether the user wishes to remain on the second channel or return to the first.

Additionally, the electronic device may automatically return to the first channel when the advertisement is finished to avoid having the user miss any program content. Along with any of this technology, it may be initiated by the user on or off at any time, such that the user may institute a command to utilize any of the interactive features, or even the technology alone, such as by instructing the electronic device when viewing begins to adjust channels based on a determination of each channel presenting program or advertising content. If multiple tuners are available on the electronic device, the user may assign any number of them to as many channels as there are available tuners, and then in embodiments have a prompt that shows whether each of the selected channels is currently showing commercial content or program content. The user may then select among the channels for alternative viewing. In embodiments in which one or more tuners is used that is capable of capturing multiple frequencies up to the entire broadcast band, the technology may be sustained utilizing a single tuner or set of tuners that provides each broadcast channel for use by the receiver in performing the technology.

The electronic device may determine whether commercial content is being displayed by any number of technologies. For example, the audiovisual content received may already include embedded information such as tags identifying programming content and/or advertising content within the broadcast. The electronic device may be configured to recognize the tags for faster recognition and navigation. The tags or other information may be embedded by a broadcaster, content provider, etc. in various embodiments. Additionally, the electronic device may include further capabilities to review content for advertisements. The technology may include comparison between frames of content to identify advertising content, or software configured to analyze for particular patterns, such as breaks between content such as between different advertisements, for example, or any other technology allowing it to differentiate between program content and advertising content.

In disclosed embodiments the advertising content may also or separately be identified externally to the electronic device. For example, at the television service provider system or at any location along the satellite network or other network such as network 190 described above, one or more devices may be utilized to perform aspects of the technology described. As certain electronic devices, such as television receivers, may include limited capabilities with respect to available tuners, one or more external devices may be configured to review and/or tag content for users. Such equipment may be configured to include sufficient tuners to monitor all channels broadcast at a given time including one or more tuners configured to capture the entire broadcast band, and may alone or in conjunction with additional equipment identify advertising content on individual channels. For example, a centralized device or receiver may receive and/or analyze each broadcast in real time to determine whether channels are currently showing advertising content or program content. This information may be provided across any available network, such as network 190, to one or more users. Such information may be received at individual electronic devices at user locations and be incorporated into electronic programming guides or controlling schemes as described. In this way, the assessment of content may be removed from the electronic device, which may further reduce latency at individual electronic devices. Additionally, the described technology may be further expanded to individuals with less sophisticated equipment, but that are capable of receiving such information from an external device.

The external device may also be configured to provide predetermined advertising timing information to individual receivers. For example, when content developers provide program content to service providers, often the timing for when advertising content will be displayed is already known. Accordingly, at the service provider or an external operator, such as with an external device to user receivers or with an external system, information may be generated previously or at the time or broadcast of programming content as to when advertising content will be shown, e.g. from time 1 to time 2 during the broadcast, or at time 1 for a specified amount of time. This external information may then be transmitted to individual electronic devices, such as user receivers, for use in the described technology. For example, such information may not require continuous updates, and may receive periodic updates for program content limiting bandwidth used.

The information received from the external device may be stored locally on data storage of the electronic device, and be updated automatically and in real time as updates are received from the external device. In such a configuration, when a channel change command is received, the electronic device may reference the stored information provided by the external device to determine if the next sequential channel is showing advertising content, and make determinations based on this reference data.

The technology may also be configured to recognize channels that do not typically present advertisements, such as premium content channels or movie channels that often present commercial-free content. This may allow the electronic device to assign or adjust tuners around such channels where review may not be necessary. For example, if a user is watching a first channel, and the next sequential channel up is a movie channel that does not include commercial breaks, the electronic device may effectively ignore this channel during operations of the present technology. If the electronic device is automatically assigning tuners to channels adjacent the first channel being viewed in anticipation of a change, the device may skip the movie channel and then assign more tuners in the channel direction opposite the movie channel, such as if the movie channel is the next sequential channel up in relation to the first channel, the tuners may all be assigned below the first channel, or up to or around the movie channel. As would be understood, a variety of other configurations may be performed that are encompassed by this technology and recognizable from these non-limiting examples.

Figure 4:
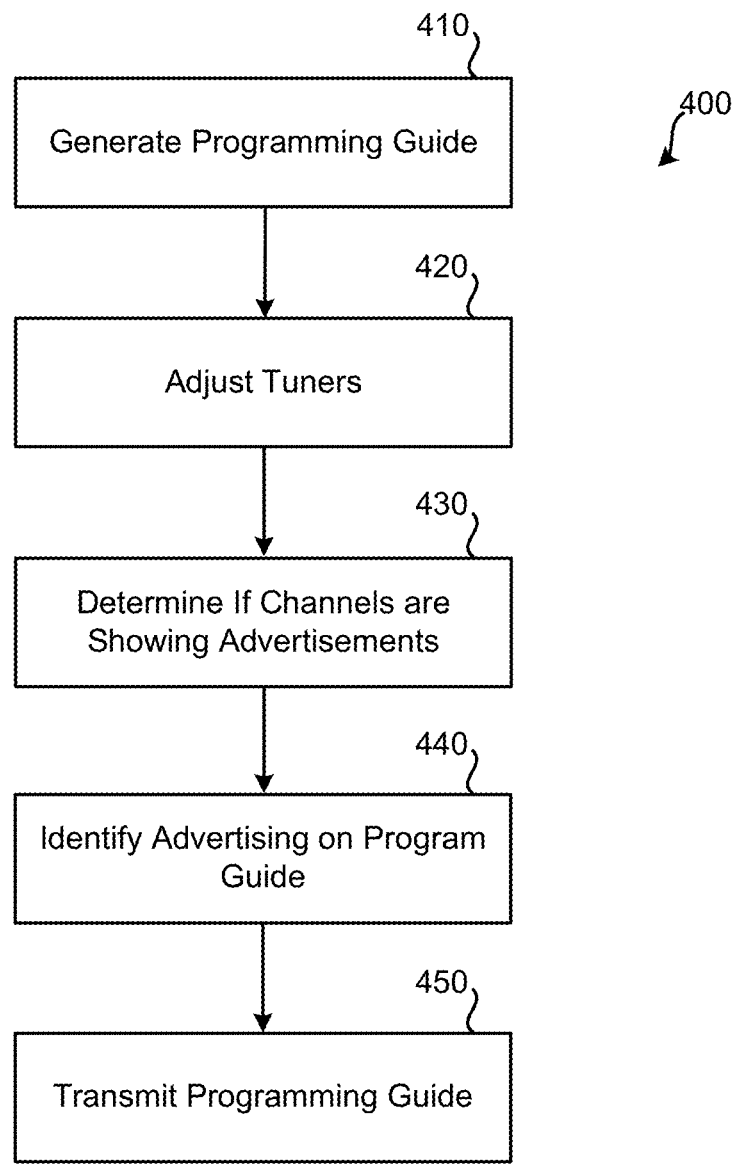
FIG. 4 shows a simplified flow diagram of a method for aiding navigation according to embodiments of the present technology.

FIG. 4 illustrates another embodiment of a method 400 for performing content navigation according to the present technology, which may also be implemented as instructions executed by an electronic device. Method 400 may be performed using any of the systems or components previously described. Method 400 may allow for a user to view on a programming guide programs that are currently displaying advertising content. Each step of method 400 may be performed by an electronic device, such as an STB, DVR, television receiver, etc., or may be performed with more than one device in communication with one another. Means for performing each step of method 400 include a first electronic device and/or the various components of an electronic device or distribution system, such as those detailed in relation to FIGS. 1 and 2, and method 400 may include some or all of the technology and functionality discussed in Method 300, and vice versa. Method 400 may be performed using a computerized device, such as a device incorporating some or all of the components of computer system 600 of FIG. 6.

An electronic device may include at least one input component configured to receive audiovisual content including both program content and advertising content. The electronic device may also include at least one output component communicatively coupled with at least one display device, as well as processors and memory that stores instructions which may implement operations of a method. At operation 410, the electronic device may generate a programming guide including a first plurality of channels to be displayed upon transmission of the programming guide to the display device. The electronic device may adjust each of a plurality of tuners of the electronic device to each individual channel of the first plurality of channels at operation 420.

At operation 430, the electronic device may determine whether each of the individual channels of the first plurality of channels is presenting advertising content. The electronic device may identify on the programming guide each individual channel that is currently presenting advertising content at operation 440, and the electronic device may transmit the programming guide to the display device at operation 450. The programming guide may be displayed in any number of formats, and may generally present a portion or subset of the available channels in the programming guide. For example, the programming guide may display 4 or 5 channels visibly, and may be navigable to additional channels, such as with up, down, page up, page down, entering specific channel information, etc., functionality. Although it is to be understood that the technology may be extended to any number of available channels or based on any number of available tuners, a non-limiting example will be utilized based on four channels being displayed in a programming guide per visible screen, e.g. adjustments will present an additional or alternative 4 channels.

When a user selects a function or commands the electronic device to display an electronic programming guide (EPG), the electronic device may output for display a portion of the EPG which displays a subset of available channels, such as 4 channels. A plurality of tuners, such as 4 tuners in this example although any number of tuners as previously described may be available on the electronic device, may then be adjusted or set to each of the four channels displayed in the EPG to begin reviewing the currently presented content on each of those channels. After determining for each channel whether the channel is presently showing advertising content, the electronic device may identify on the EPG which programs are currently showing advertisements. Also, as previously described, a single tuner or set of tuners may each be capable of receiving multiple frequencies up to the entire broadcast spectrum in which case the equipment reviewing the programs or performing the operations may be sustained by a single tuner providing multiple broadcast frequency content.

The technology may also include the electronic device receiving another or subsequent user command to adjust the programming guide to show information for a second plurality of channels. The electronic device may update the EPG to show the second plurality of channels, and may previously, subsequently, or simultaneously adjust each of the plurality of tuners of the electronic device to each individual channel of the second plurality of channels currently being displayed on the EPG. The electronic device may then determine whether each of the individual channels of the second plurality of channels is presenting advertising content.

The electronic device may also identify on the EPG each individual channel of the second plurality of channels that is presenting advertising content. If the programs currently displayed on the EPG include one or more channels known to regularly show commercial-free content, the electronic device may determine or be instructed not to assign a tuner to such channels for review. The electronic device may also be instructed to maintain at least one tuner on one or more particular or predetermined channels, where the device does not utilize that or those tuners in other operations. For example, a user may instruct the electronic device to always maintain a tuner on one or more channels, such as local broadcast stations or favorite stations, if they are channels the user typically wishes to review. By maintaining or assigning one or more tuners in this way, delay in the review process may be reduced or avoided during operation of the technology. Various other examples in line with the numerous examples described herein are also encompassed by the present technology as would be generally understood.

The EPG may also be updated based on information received from an external device as described previously. For example, an external device or system that may or may not be associated with the service provider may analyze one or more and up to all channels simultaneously for advertising content. This analysis may be performed in real time, and may be used to generate a list or data set of channels currently showing advertising content instead of programming content. Such information may be transmitted via any available network to one or more individual electronic devices, such as individual user receivers. The receivers may store or update internal tables of programming information based on this received information from the electronic device. When an EPG is updated or generated, the electronic device may reference the received information to determine whether each channel is currently showing advertising content, and may update the EPG accordingly. In so doing, latency in identifying programs showing advertising content may be reduced.

Figure 5:
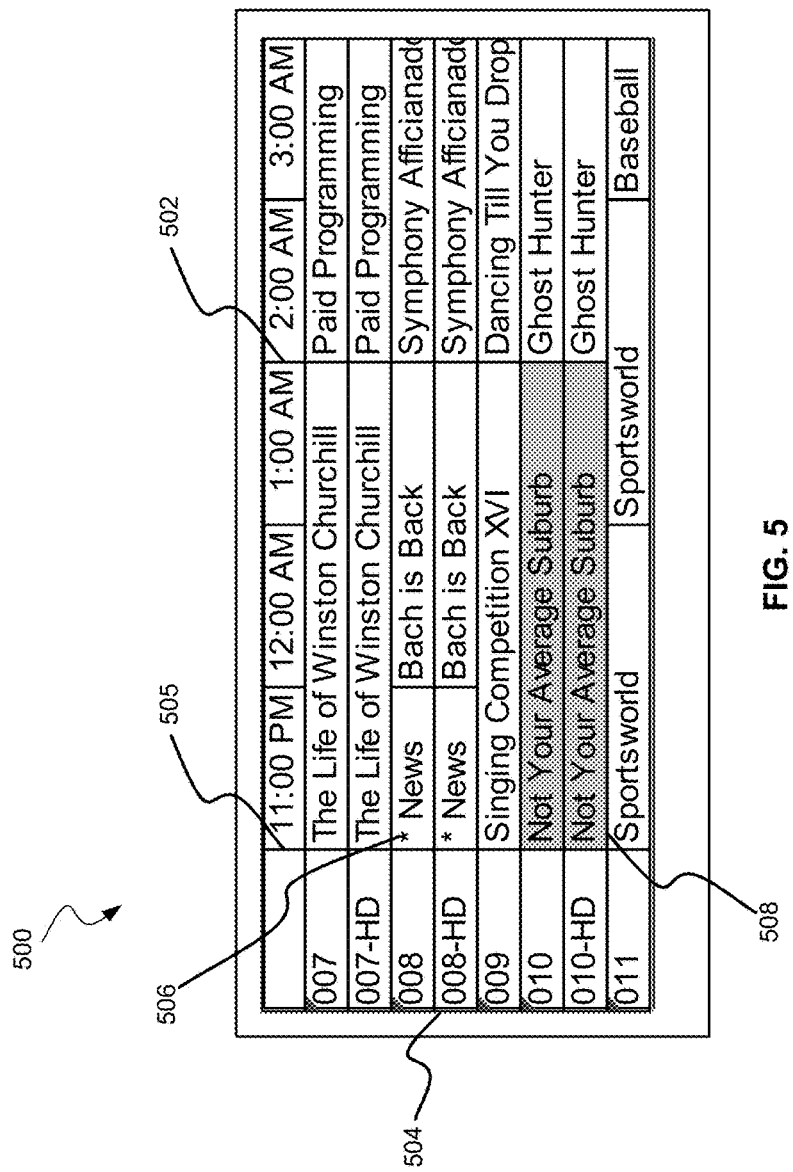
FIG. 5 shows an exemplary program guide that identifies programs on commercial break according to embodiments of the present technology.

The identification displayed on the EPG may take any or a combination of a number of forms. FIG. 5 illustrates an exemplary program guide 500 that identifies programs on commercial break according to embodiments of the present technology. As illustrated, electronic programming guide (EPG) 500 displays information including a subset of available channels 504, and a timescale 502 that may cover the present time 505. When the electronic device performs a review for advertising content, it may identify one or more channels currently presenting advertising content. The electronic device may then update the EPG to identify each of those channels presenting advertising content. As illustrated, the identification may take any number of forms including an icon 506 of some type, or some modification 508 of the program element itself, which can include shading, coloring, highlighting, or otherwise adjusting the display to identify or differentiate channels presenting advertising content at that time. As would be understood, any number of icons, modifications, or notifications could be used to relay the information to a user that a channel is currently displaying advertising content, all of which are encompassed by the present technology.

Figure 6:
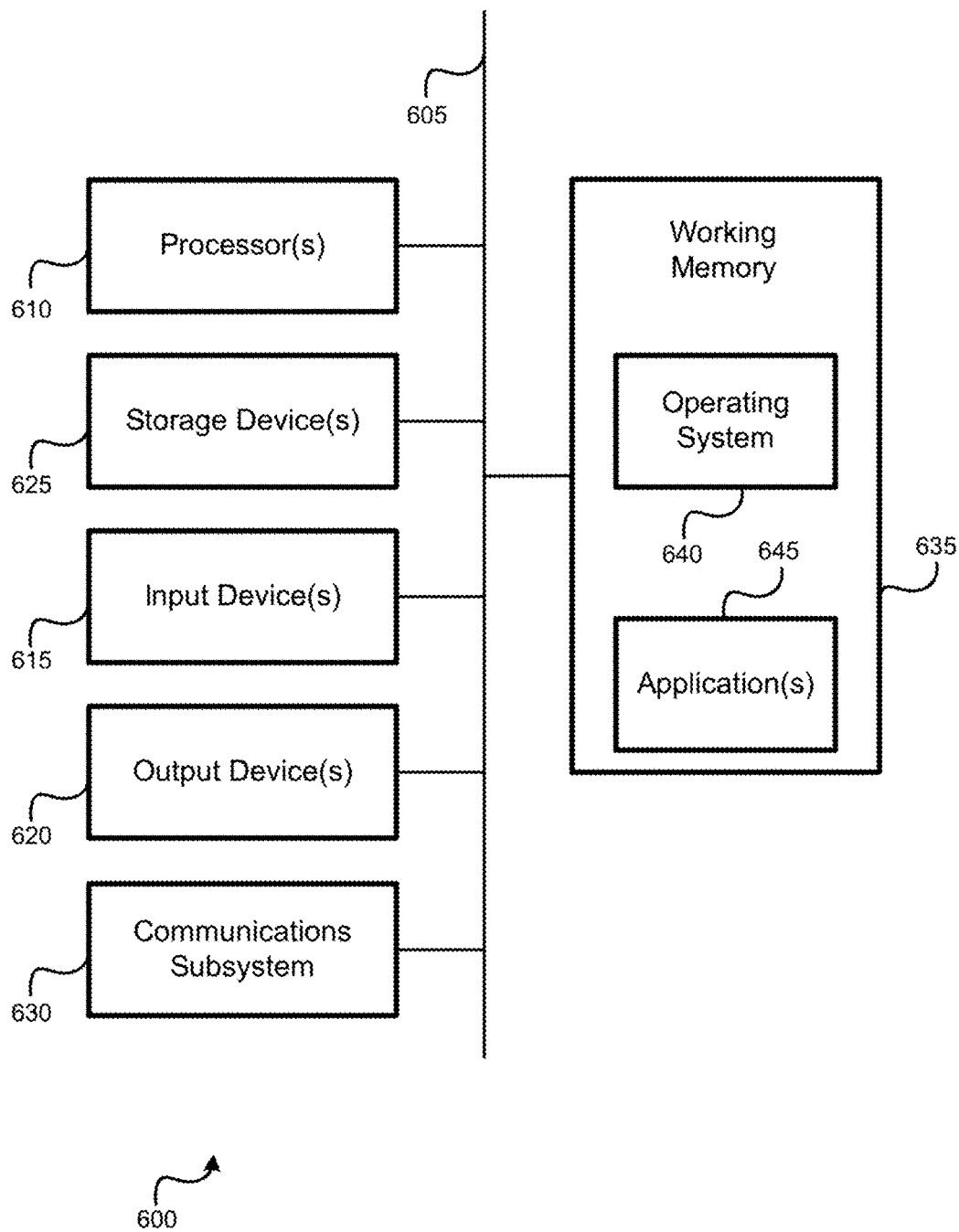
FIG. 6 shows a simplified computer system that may be utilized to perform one or more of the operations discussed.

FIG. 6 illustrates an embodiment of a computer system 600. A computer system 600 as illustrated in FIG. 6 may be incorporated into devices such as an STB, a first electronic device, DVR, television, media system, personal computer, and the like. Moreover, some or all of the components of the computer system 600 may also be incorporated into a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device or STB, as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 3 and 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium.

Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An electronic device comprising:
   at least one input component to receive audiovisual content including both program content and advertising content;
   at least one output component communicatively coupled with at least one display device;
   one or more processors; and
   a memory communicatively coupled with and readable by the one or more processors and having stored therein processor-readable instructions, which when executed by the one or more processors cause the one or more processors to:
   generate a programming guide including a first plurality of channels to be displayed upon transmission of the programming guide to the display device;
   adjust each of a plurality of tuners of the electronic device to each individual channel of the first plurality of channels to determine whether each of the individual channels of the first plurality of channels is currently carrying advertising content,
   wherein the adjusting each of the plurality of tuners of the electronic devices comprises:
      adjusting a first tuner of the plurality of tuners to a first channel of the first plurality of channels, the first channel carrying a broadcast;
      outputting first content corresponding to the broadcast to a display; and
      during the outputting the first content corresponding to the first channel, adjusting one of more additional tuners of the plurality of tuners to one or more adjacent channels, which are adjacent to the first channel, to determine whether each of the one or more adjacent channels is currently carrying advertising content in anticipation of a change from the first channel to the one or more adjacent channels, wherein a channel that is currently carrying advertising content is automatically skipped by the one of more additional tuners during the adjusting of the one or more additional tuners;
   switch from outputting the first content corresponding to the first channel to outputting alternative content on an alternate channel using one or more additional tuners in response to a commercial break occurring in the broadcast carried by the first channel, the alternative content being alternative to the first content;
   while outputting the alternative content, maintain the first tuner to the first channel to review the first channel to determine whether the commercial break is still ongoing, in anticipation of a return to the first channel;
   identify on the programming guide each individual channel that is currently carrying advertising content instead of content, wherein identifying on the programming guide comprises, in response to determining the first channel that is currently carrying advertising content, automatically adjusting a display of a scheduled time slot assigned to the first channel that is currently carrying advertising content by any of shading, highlighting or coloring the display of the scheduled time slot assigned to the first channel within the programming guide;
   transmit the programming guide to the display device to cause presentation of the adjusted display of the scheduled time slot assigned to the first channel that is currently carrying advertising content to allow skipping of the first channel that is currently carrying the advertising content so that audiovisual content of the first channel is not presented on the display of the scheduled time slot assigned to the first channel that is currently carrying advertising content;
   subsequent to the adjusting of the display of the scheduled time slot assigned to the first channel, monitoring the first channel to detect a return to program content after a termination of the commercial break; and
   based on the monitoring, updating the programming guide to subsequently adjust the adjusted display of the scheduled time slot assigned to the first channel by adjusting the any of the shading, the highlighting or the coloring of the scheduled time slot assigned to the first channel, and cause presentation of the subsequently adjusted display of the scheduled time slot assigned to the first channel.

2. The electronic device of claim 1, wherein the one or more processors are further caused to:
   receive a user command to adjust the programming guide to a second plurality of channels;
   adjust each of the plurality of tuners of the electronic device to each individual channel of the second plurality of channels;
   determine whether each of the individual channels of the second plurality of channels is presenting advertising content;
   adjust the programming guide to the second plurality of channels; and identify on the programming guide each individual channel that is presenting advertising content.

3. The electronic device of claim 1, wherein the electronic device determines not to adjust, as part of the adjusting each of the plurality of tuners, at least one tuner of the plurality of tuners to a second channel that presents known commercial-free content.

4. The electronic device of claim 1, wherein the identifying on the programming guide further comprises placing an icon with the scheduled time slot assigned to the first channel that is currently carrying advertising content.

5. The electronic device of claim 1, wherein the determining whether each of the individual channels of the first plurality of channels is currently carrying advertising content comprises reviewing at least some frames of the received audiovisual content to identify advertising content.

6. The electronic device of claim 1, wherein the electronic device includes at least one tuner maintained on a particular predetermined channel so that the at least one tuner does not adjust to another channel during the adjusting each of the plurality of tuners.

7. The electronic device of claim 1, wherein the electronic device comprises at least four tuners.

8. The electronic device of claim 1, wherein the electronic device comprises a television receiver.

9. A method of providing an electronic programming guide, the method comprising:
receiving audiovisual content from a broadcast source at an electronic device;
generating an electronic programming guide at the electronic device, wherein the electronic programming guide includes a first plurality of channels to be displayed upon transmission of the electronic programming guide to a display device;
setting each of a plurality of tuners of the electronic device to each individual channel of the first plurality of channels to determine whether each of the individual channels is currently carrying advertising content, wherein the setting each of the plurality of tuners of the electronic devices comprises:
adjusting a first tuner of the plurality of tuners to a first channel of the first plurality of channels, the first channel carrying a broadcast;
outputting first content corresponding to the broadcast to a display; and
during the outputting the first content corresponding to the first channel, adjusting one of more additional tuners of the plurality of tuners to one or more adjacent channels, which are adjacent to the first channel, to determine whether each of the one or more adjacent channels is currently carrying advertising content in anticipation of a change from the first channel to the one or more adjacent channels, wherein a channel that is currently carrying advertising content is automatically skipped by the one of more additional tuners during the adjusting of the one or more additional tuners;
switching from outputting the first content corresponding to the first channel to outputting alternative content on an alternate channel using one or more additional tuners in response to a commercial break occurring in the broadcast carried by the first channel, the alternative content being alternative to the first content;
while outputting the alternative content, maintaining the first tuner to the first channel to review the first channel to determine whether the commercial break is still ongoing, in anticipation of a return to the first channel;
incorporating indicia, by the electronic device, on the electronic programming guide that identifies each individual channel of the first plurality of channels that is currently carrying advertising content instead of content, wherein the incorporating the indicia on the electronic programming guide comprises, in response to determining the first channel that is currently carrying advertising content, automatically adjusting a display of a scheduled time slot assigned to the first channel that is currently carrying advertising content by any of shading, highlighting or coloring the display of the scheduled time slot assigned to the first channel within the electronic programming guide;
subsequent to incorporating the indicia, transmitting the electronic programming guide to a display device to cause presentation of the adjusted display of the scheduled time slot assigned to the first channel that is currently carrying advertising content to allow skipping of the first channel that is currently carrying advertising content so that audiovisual content of the first channel is not presented on the display of the scheduled time slot assigned to the first channel that is currently carrying advertising content;
subsequent to the adjusting of the display of the scheduled time slot assigned to the first channel, monitoring the first channel to detect a return to program content after a termination of the commercial break; and
based on the monitoring, updating the electronic programming guide to subsequently adjust the adjusted display of the scheduled time slot assigned to the first channel by adjusting the any of the shading, the highlighting or the coloring of the scheduled time slot assigned to the first channel, and cause presentation of the subsequently adjusted display of the scheduled time slot assigned to the first channel.

10. The method of claim 9, further comprising, subsequent to transmitting the electronic programming guide:
receiving at the electronic device a user command to adjust the electronic programming guide to a second plurality of channels;
adjusting each of the plurality of tuners of the electronic device to each individual channel of the second plurality of channels;
analyzing, at the electronic device, at least some of the audiovisual content received from the broadcast source on each tuner of the plurality of tuners;
determining whether each of the individual channels of the second plurality of channels is presenting advertising content;
adjusting to the second plurality of channels the electronic programming guide being transmitted; and
incorporating additional indicia by the electronic device on the electronic programming guide that identifies each individual channel of the second plurality of channels that is presenting advertising content.

11. The method of claim 9, wherein the electronic device determines not to adjust, as part of the setting each of the plurality of tuners, at least one tuner of the plurality of tuners to a second channel that presents known commercial-free content.

12. The method of claim 9, wherein the incorporating the indicia comprises placing an icon with the scheduled time slot assigned to the first channel that is currently carrying advertising content.

13. The method of claim 9, wherein the determining whether each of the individual channels of the first plurality of channels is currently carrying advertising content comprises reviewing at least some frames of the received audiovisual content to identify advertising content.

14. The method of claim 9, wherein the electronic device includes at least one tuner maintained on a channel preselected by a user channel so that the at least one tuner does not adjust to another channel during the adjusting each of the plurality of tuners.

15. The method of claim 9, wherein the electronic device comprises at least four tuners.

16. The method of claim 9, wherein the electronic device comprises a television receiver.

\* \* \* \* \*